(12) United States Patent
Beach (10) Patent No.: US 11,203,072 B2
(45) Date of Patent: Dec. 21, 2021

(54) TOOTH FORMATIONS AND ARRANGEMENT FOR A SAW BLADE

(71) Applicant: BLACK & DECKER INC., New Britain, CT (US)

(72) Inventor: Justin Beach, East Hartford, CT (US)

(73) Assignee: BLACK & DECKER INC., New Britain, CT (US)

( * ) Notice: Subject to any disclaimer, the term of this patent is extended or adjusted under 35 U.S.C. 154(b) by 131 days.

(21) Appl. No.: 16/682,826

(22) Filed: Nov. 13, 2019

(65) Prior Publication Data

US 2020/0078873 A1    Mar. 12, 2020

Related U.S. Application Data

(63) Continuation of application No. 16/204,504, filed on Nov. 29, 2018, now Pat. No. 10,512,972, which is a
(Continued)

(51) Int. Cl.
| | | |
|---|---|---|
| *B23B 51/04* | (2006.01) | |
| *B27B 33/02* | (2006.01) | |

(Continued)

(52) U.S. Cl.
CPC ........ *B23B 51/0406* (2013.01); *B23D 61/021* (2013.01); *B23D 61/121* (2013.01); *B23B 2251/14* (2013.01); *B23B 2251/28* (2013.01)

(58) Field of Classification Search
CPC ............ B23B 2251/14; B23B 2251/28; B23B 51/0406; B23B 51/05; B23B 51/04;
(Continued)

(56) References Cited

U.S. PATENT DOCUMENTS

| | | |
|---|---|---|
| 4,557,172 A | 12/1985 | Yoneda |
| 5,606,900 A | 3/1997 | Stoddard |

(Continued)

FOREIGN PATENT DOCUMENTS

| | | |
|---|---|---|
| CN | 203696058 U | 7/2014 |
| CN | 203887281 U | 10/2014 |

(Continued)

OTHER PUBLICATIONS

Rijks, Mark—Extended European Search Report—dated Jan. 4, 2018—8 pages—The Hague.

(Continued)

*Primary Examiner* — Nicole N Ramos
(74) *Attorney, Agent, or Firm* — Scott B. Markow (57) ABSTRACT

A saw blade can include a blade body having a cutting edge defined by multiple teeth. The teeth can be disposed in a repeating pattern including a raker tooth, a first set tooth having a light offset to a right side of the blade body, a second set tooth having a heavy offset to the left side of the blade body, a second raker tooth, a third set tooth having a light offset to the left side, and a fourth set tooth having a heavy offset to the right side of the blade body. Each tooth can include a tip, rake face, gullet having a gullet depth, and one or more clearance surfaces. The pitch distance and gullet depth of the heavy offset teeth can be less than the pitch distances and gullet depths of the remaining teeth to provide an increased amount of strength for the heavy offset teeth.

20 Claims, 4 Drawing Sheets

Related U.S. Application Data continuation of application No. 15/248,583, filed on Aug. 26, 2016, now Pat. No. 10,166,612.

(51) Int. Cl.
*B23D 61/02* (2006.01)
*B23D 61/12* (2006.01)

(58) Field of Classification Search
CPC . B23D 61/021; B23D 61/121; Y10T 408/895; Y10T 408/8957; Y10T 408/896
See application file for complete search history.

(56) References Cited

U.S. PATENT DOCUMENTS

| | | |
|---|---|---|
| 5,803,677 A | 9/1998 | Korb et al. |
| 5,803,678 A | 9/1998 | Korb et al. |
| 6,003,422 A | 12/1999 | Holston |
| 6,158,324 A | 12/2000 | Kullman et al. |
| 6,167,792 B1 | 1/2001 | Korb et al. |
| 6,588,992 B2 | 7/2003 | Rudolph |
| 6,601,495 B2 | 8/2003 | Cranna |
| 7,017,465 B2 | 3/2006 | Dion et al. |
| 7,225,714 B2 | 6/2007 | Rompel et al. |
| 7,451,678 B2 | 11/2008 | Dion et al. |
| 7,658,136 B2 | 2/2010 | Rompel et al. |
| 8,826,790 B2 | 9/2014 | Mabon et al. |
| 9,370,834 B2 | 6/2016 | Elliston et al. |
| 2001/0004860 A1 | 6/2001 | Kulmann et al. |
| 2002/0194975 A1 | 12/2002 | Bishop |
| 2004/0042861 A1 | 3/2004 | Capstran |
| 2005/0257660 A1 | 11/2005 | Hayden |
| 2008/0307936 A1 | 12/2008 | Elliston et al. |
| 2011/0154970 A1 | 6/2011 | Oshibe et al. |
| 2011/0271815 A1 | 11/2011 | Elliston et al. |
| 2012/0000338 A1 | 1/2012 | Elliston et al. |
| 2012/0093599 A1 | 4/2012 | Evatt et al. |
| 2012/0230788 A1 | 9/2012 | Bozic et al. |
| 2014/0023446 A1 | 1/2014 | Piller et al. |
| 2014/0023447 A1 | 1/2014 | Thorn et al. |

FOREIGN PATENT DOCUMENTS

| | | |
|---|---|---|
| EP | 1354655 A1 | 10/2003 |
| EP | 1785210 A1 | 5/2007 |
| JP | 2000135625 A | 5/2000 |
| JP | 20001356625 | 5/2000 |
| KR | 100625218 | 9/2006 |

OTHER PUBLICATIONS

Communication pursuant to Article 94(3) from the European Patent Office, issued in application No. 17186715.3, dated Jun. 5, 2021, 5 pages.

TOOTH FORMATIONS AND ARRANGEMENT FOR A SAW BLADE

RELATED APPLICATIONS

This application is a continuation of and claims priority under 35 U.S.C. § 120 to U.S. patent application Ser. No. 16/204,504, filed Nov. 29, 2018, which is a continuation of U.S. patent application Ser. No. 15/248,583, filed on Aug. 26, 2016. The entire contents of each of these applications are incorporated by reference herein in its entirety for all purposes.

TECHNICAL FIELD

Embodiments disclosed herein are generally related to saw blades, and more particularly to a saw blade with improved tooth formations and arrangement for providing improved tooth strength.

BACKGROUND

Conventional hole cutters, also known as hole saws or cup saw, comprise a circular base, a peripheral wall formed on one side of the base and extending axially therefrom, and multiple cutting teeth machined in the outer edge of the peripheral wall. The base, peripheral wall, and cutting teeth can be machined from a piece of steel to form a hole cutter of unitary construction. An example of a hole saw is illustrated in U.S. Pat. No. 5,803,678, which is incorporated by reference herein in its entirety.

Other conventional hole saws are manufactured by forming the saw teeth in an elongated metal band that makes up a blade body, and then welding the metal band in a circular configuration onto a rigid cap plate. In either case, in an effort to increase cutting speed of the saw blade into a material, the width of the blade body has been decreased over time. While decreasing the width of the blade body can increase cutting speed, it can have some negative side effects. For instance, reducing the width of the blade body reduces the amount of material constituting each tooth, thus a given applied force will generate higher stresses in the thinner cross section. This can result in teeth that are weaker and more prone to breaking off from the blade body.

This potential for breaking off teeth can be increased when the teeth are offset from the blade body. The potential for breaking off teeth can also be increased when the teeth have varying tooth tip heights, as the teeth that extend out further from the blade body are likely to receive more force and have a higher moment during a cutting operation. Further, once one tooth breaks from the saw blade, it is more likely for multiple teeth to break off. Accordingly, reducing tooth break off can increase the useful life of a saw blade.

BRIEF DESCRIPTION OF THE DRAWINGS

For a more complete understanding of the present disclosure and certain features thereof, reference is now made to the following description, in conjunction with the accompanying figures briefly described as follows.

DETAILED DESCRIPTION

Example embodiments of the invention now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

The example embodiments described herein and shown in the figures are described with reference to a saw blade having multiple teeth. The saw blade can be incorporated into any type of saw including, but not limited to, a hole saw, a band saw, a circular saw, a jigsaw, a hacksaw, and/or a reciprocating saw. While the example embodiments will generally be described with reference to a hole saw or cup saw having a repeating pattern of saw blade teeth as described herein, the reference to a hole saw or cup saw is for example purposes only, as the tooth formations and arrangements described herein can be incorporated into any device that uses a toothed blade including, but not limited to, a hole saw, a band saw, a circular saw, a jigsaw, a hacksaw, and/or a reciprocating saw. Each of the band saw, circular saw, jigsaw, hacksaw, and/or reciprocating saw should individually be read as an alternative embodiment to the hole saw described below.

Certain dimensions and features of the example saw blade are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the saw blade and between features of the saw blade are described herein using the term "substantially." As used herein, the term "substantially" indicates that each of the described dimensions is not a strict boundary or parameter and does not exclude functionally similar variations therefrom. Unless context or the description indicates otherwise, the use of the term "substantially" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

Further, certain relationships between dimensions of the saw blade and between features of the saw blade are described herein using the term "substantially equal". As used herein, the term "substantially equal" indicates that the equal relationship is not a strict relationship and does not exclude functionally similar variations therefrom. Unless context or the description indicates otherwise, the use of the term "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

A hole saw, hole cutter, or cup saw, is a type of cutter used in drilling circular holes in various materials, such as wood, metal, drywall, etc. A hole saw typically has a substantially cylindrical body that defines a side wall and a hollow interior within the side wall, a circular cutting edge or saw blade with a multiple teeth (such as those shown and described in FIGS. 1-5B below) located at one end of the body that are designed to cut a work piece during rotation of the cutter, and a cap located at the end of the body opposite the cutting edge for attaching the hole saw to a driving device, such as a drill or other motorized device. The cap can include threads, holes, or other structure adapted to allow the hole saw to be drivingly connected to a drill, such as through an arbor. In use, the circular cutting edge or saw blade of the hole saw can create a circular hole in a work piece and, in turn, can remove a circular work piece slug therefrom. Typically, after the hole is cut in the work piece, the work piece slug is retained within the hollow interior of the hole saw and must be removed therefrom prior to cutting another hole.

Figure 1:
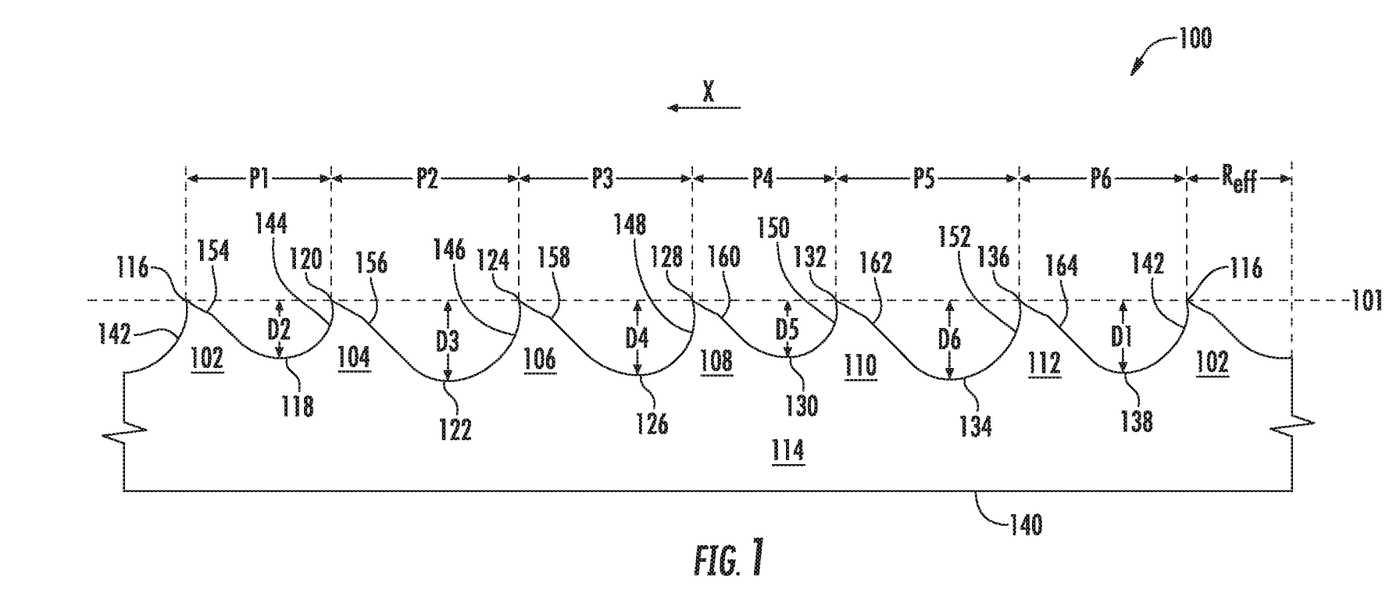
FIG. 1 is a partial side elevation view of a saw blade according to one example embodiment of the disclosure.

FIG. 1 presents a partial side elevation view of a saw blade 100 according to one example embodiment of the disclosure. Referring now to FIG. 1, the example saw blade 100 includes a blade body 114. The blade body 114 can include a first end 140 and an opposing second end. The second end of the blade body 114 can include or be coupled to a cutting edge 101 defined by multiple saw teeth 102-112. In certain example embodiments, the blade body 114 and the saw teeth 102-112 can be made from a single piece of material. In another example embodiment, the blade body 114 and the saw teeth 102-112 can be made from different materials and the saw teeth 102-112 can be welded or otherwise coupled to the second end of the blade body 114 during the manufacturing process. In example embodiments where the blade body 114 and saw teeth 102-112 are made from different materials, the blade body 114 can be made from a spring steel alloy and the saw teeth 102-112 can be made from high-speed steel. However, the materials described are for example purposes only, as other materials may be substituted for the spring steel alloy and or the high-speed steel depending on cost and use factors.

While the example saw blade 100 shows seven saw teeth, this is for example purposes only. A complete saw blade will include more than seven teeth. However, the teeth 102-112 are provided to show one example embodiment of a repeating pattern of saw teeth 102-112, which would continuously repeat in the order shown along the length of the blade body 114. Each tooth 102-112 can include a tip, a rake face, and one or more relief surfaces extending from the tip in a direction opposite to the saw blade's cutting direction, arrow X. In one example, all of the tips of all of the teeth of the saw blade 100 can be at the same height. Providing teeth on the saw blade that all extend to a tip of the same height can allow for more consistent wear of all of the teeth on the saw blade 100. In addition, providing teeth on the saw blade 100 that all extend to a tip of the same height (e.g., all of the teeth are disposed along a single cutting plane) can reduce the stress per tooth, as all of the teeth are cutting the material to be cut in the same plane. Providing teeth on the saw blade 100 that all extend to a tip of the same height also aids by reducing the binding during cutting that can be caused by teeth that extend up vertically higher than other teeth in the patter catching in the material to be cut and causing the saw to bind. Providing teeth on the saw blade 100 that all extend to a tip of the same height also can reduce tooth loss/break off during use and can reduce the likelihood of the taller teeth binding while cutting during use of the saw.

In one example, the first tooth 102 can include a tooth tip 116, a rake face 142, and one or more relief surfaces 154. The second tooth 104 can include a tooth tip 120, a rake face 144 and one or more relief surfaces 156. The third tooth 106 can include a tooth tip 124, a rake face 146, and one or more relief surfaces 158. A fourth tooth 108 can include a tooth tip 128, a rake face 148, and one or more relief surfaces 160. The fifth tooth 110 can include a tooth tip 132, a rake face 150, and one or more relief surfaces 162. The sixth tooth 112 can include a tooth tip 136, a rake face 152, and one or more relief surfaces 164.

The teeth 102-112 are spaced along the cutting edge 101 with the tip of one tooth and the tip of the next consecutively disposed tooth cooperating to define a pitch distance P. For example, the distance between the tip 120 of the second tooth 104 and the tip 116 of the first tooth 102 can have a pitch distance of P1. In one example embodiment, the pitch distance P1 can be anywhere between substantially 0.1500 inches to substantially 0.2400 inches and more preferably anywhere between substantially 0.1700 inches to substantially 0.2200 inches, and more preferably anywhere between substantially 0.1800 inches to substantially 0.2000 inches, and more preferably 0.1900 inches.

The distance between the tip 124 of the third tooth 106 and the tip 120 of the second tooth 104 can have a pitch distance of P2. In one example, embodiment, the pitch distance P2 is greater than the pitch distance P1. In one example embodiment, the pitch distance P2 can be anywhere between substantially 0.2200 inches to substantially 0.2700 inches and more preferably anywhere between substantially 0.2300 inches to substantially 0.2600 inches, and even more preferably anywhere between substantially 0.2400 inches to substantially 0.2500 inches and more preferably 0.2450 inches.

The distance between the tip 128 of the fourth tooth 108 and the tip 124 of the third tooth 106 can have a pitch distance of P3. In one example, embodiment, the pitch distance P3 is greater than the pitch distance P1 and less than the pitch distance of P2. In one example embodiment, the pitch distance P3 can be anywhere between substantially 0.1950 inches to substantially 0.2550 inches and more preferably anywhere between substantially 0.2050 inches to substantially 0.2450 inches, and even more preferably anywhere between substantially 0.2150 inches to substantially 0.2350 inches and more preferably 0.2270 inches.

The distance between the tip 132 of the fifth tooth 110 and the tip 128 of the fourth tooth 108 can have a pitch distance of P4. In one example, embodiment, the pitch distance P4 is less than the pitch distances of P1, P2, and P3. In one example embodiment, the pitch distance P4 can be anywhere between substantially 0.1550 inches to substantially 0.2150 inches and more preferably anywhere between substantially 0.1650 inches to substantially 0.2050 inches, and even more preferably anywhere between substantially 0.1750 inches to substantially 0.1950 inches and more preferably 0.1870 inches.

The distance between the tip 136 of the sixth tooth 112 and the tip 132 of the fifth tooth 110 can have a pitch distance of P5. In one example, embodiment, the pitch distance P5 is greater than the pitch distances of P1, P3, and P4 and less than the pitch distance of P2. In one example embodiment, the pitch distance P4 can be anywhere between substantially 0.2100 inches to substantially 0.2700 inches and more preferably anywhere between substantially 0.2200 inches to substantially 0.2600 inches, and even more preferably anywhere between substantially 0.2300 inches to substantially 0.2500 inches and more preferably 0.2400 inches.

The distance between the tip 136 of the sixth tooth 112 and the tip 116 of the first tooth 102 can have a pitch distance of P6. In one example, embodiment, the pitch distance P6 is less than the pitch distances of P2, P3, and P5 and greater than the pitch distances of P1 and P4. In one example embodiment, the pitch distance P4 can be anywhere between substantially 0.1800 inches to substantially 0.2500 inches and more preferably anywhere between substantially 0.2000 inches to substantially 0.2400 inches, and even more preferably anywhere between substantially 0.2100 inches to substantially 0.2300 inches and more preferably 0.2190 inches.

A curvilinear base surface extends between the rake face of one tooth and the one or more relief surfaces of the next consecutive tooth in front of the one tooth in the cutting direction X. In certain example embodiments, the base surface is tangent to the rake face. For each pair of teeth positioned adjacent one another, the rake face, the curvilinear base surface, and the one or more relief surfaces define a gullet. Each gullet has a gullet depth, which is measured as the vertical difference or distance from the tip of the following tooth (as viewed from the cutting direction X) to the lowest point of the gullet.

In one example embodiment, a first gullet 138 can be disposed between the rake face 142 of the first tooth 102 and the one or more relief surfaces 164 of the sixth tooth 112. The first gullet 138 can have an effective radius of 0.072 inches. An effective gullet radius is defined by the rake face 142, 144, 146, 148, 150, 152 and the curvilinear base surface. The effective gullet radius (Reff) is equal to the horizontal distance from the leftmost point of the gullet area, when the saw blade 100 is viewed in the orientation shown in FIG. 1, to the point where the gullet depth D1-D6 reaches its maximum value. The first gullet depth D1 can be the vertical difference or distance between the tip 116 of the first tooth 102 and the lowest point of the first gullet 138. In one example, embodiment, the gullet depth D1 can be anywhere between substantially 0.0750 inches to substantially 0.1150 inches and more preferably anywhere between substantially 0.0850 inches to substantially 0.1050 inches, and even more preferably anywhere between substantially 0.0900 inches to substantially 0.1000 inches and more preferably 0.0942 inches. Accordingly, the first gullet 138 can have a ratio of gullet radius to pitch of between substantially 30% to substantially 35% and more preferably substantially 32.9%. Further, the first gullet 138 can have a ratio of gullet radius to gullet depth of between substantially 80% to substantially 70% and more preferably substantially 76.4%. In addition, the first tooth 102 can have a ratio of gullet depth D1 to tooth pitch P6 in the range of substantially 35% to substantially 45% and more preferably substantially 43%.

In one example embodiment, a second gullet 118 can be disposed between the rake face 144 of the second tooth 104 and the one or more relief surfaces 154 of the first tooth 102. The second gullet 118 can have an effective radius of 0.065 inches. A second gullet depth D2 can be the vertical difference or distance between the tip 120 of the second tooth 104 and the lowest point of the second gullet 118. In certain example embodiments, the gullet depth D2 is less than the gullet depth D1. In one example embodiment, the gullet depth D2 can be anywhere between substantially 0.0550 inches to substantially 0.0950 inches and more preferably anywhere between substantially 0.0650 inches to substantially 0.0850 inches, and even more preferably anywhere between substantially 0.0700 inches to substantially 0.0800 inches and more preferably 0.0760 inches. Accordingly, the second gullet 118 can have a ratio of gullet radius to pitch of between substantially 30% to substantially 40% and more preferably substantially 34.2%. Further, the second gullet 118 can have a ratio of gullet radius to gullet depth of between substantially 90% to substantially 80% and more preferably substantially 85.5%. In addition, the second tooth 104 can have a ratio of gullet depth D2 to tooth pitch P1 in the range of substantially 35% to substantially 45% and more preferably substantially 40%.

In one example embodiment, a third gullet 122 can be disposed between the rake face 146 of the third tooth 106 and the one or more relief surfaces 156 of the second tooth 104. The third gullet 122 can have an effective radius of 0.083 inches. A third gullet depth D3 can be the vertical difference or distance between the tip 124 of the third tooth 106 and the lowest point of the third gullet 122. In certain example embodiments, the gullet depth D3 is greater than the gullet depth of D1 and D2. In one example embodiment, the gullet depth D3 can be anywhere between substantially 0.0850 inches to substantially 0.1250 inches and more preferably anywhere between substantially 0.0950 inches to substantially 0.1150 inches, and even more preferably anywhere between substantially 0.1000 inches to substantially 0.1100 inches and more preferably 0.1054 inches. Accordingly, the third gullet 122 can have a ratio of gullet radius to pitch of between substantially 30% to substantially 40% and more preferably substantially 33.9%. Further, the third gullet 122 can have a ratio of gullet radius to gullet depth of between substantially 85% to substantially 75% and more preferably substantially 78.7%. In addition, the third tooth 106 can have a ratio of gullet depth D3 to tooth pitch P2 in the range of substantially 35% to substantially 45% and more preferably substantially 43%.

In one example embodiment, a fourth gullet 126 can be disposed between the rake face 148 of the fourth tooth 108 and the one or more relief surfaces 158 of the third tooth 106. The fourth gullet 126 can have an effective radius of 0.077 inches. A fourth gullet depth D4 can be the vertical difference or distance between the tip 128 of the fourth tooth 108 and the lowest point of the fourth gullet 126. In certain example embodiments, the gullet depth D4 is less than the gullet depth of D3 and greater than the gullet depth of D1 and D2. In one example embodiment, the gullet depth D4 can be anywhere between substantially 0.0750 inches to substantially 0.1150 inches and more preferably anywhere between substantially 0.0850 inches to substantially 0.1050 inches, and even more preferably anywhere between substantially 0.0900 inches to substantially 0.1000 inches and more preferably 0.0976 inches. Accordingly, the fourth gullet 126 can have a ratio of gullet radius to pitch of between substantially 30% to substantially 40% and more preferably substantially 33.9%. Further, the fourth gullet 126 can have a ratio of gullet radius to gullet depth of between substantially 80% to substantially 70% and more preferably substantially 78.9%. In addition, the fourth tooth 108 can have a ratio of gullet depth D4 to tooth pitch P3 in the range of substantially 35% to substantially 45% and more preferably substantially 43%.

In one example embodiment, a fifth gullet 130 can be disposed between the rake face 150 of the fifth tooth 110 and the one or more relief surfaces 160 of the fourth tooth 108. The fifth gullet 130 can have an effective radius of 0.064 inches. A fifth gullet depth D5 can be the vertical difference or distance between the tip 132 of the fifth tooth 110 and the lowest point of the fifth gullet 130. In certain example embodiments, the gullet depth D5 is less than the gullet depth of D1, D2, D3, and D4. In one example embodiment, the gullet depth D5 can be anywhere between substantially 0.0550 inches to substantially 0.0950 inches and more preferably anywhere between substantially 0.0650 inches to substantially 0.0850 inches, and even more preferably anywhere between substantially 0.0700 inches to substantially 0.0800 inches and more preferably 0.0748 inches. Accordingly, the fifth gullet 130 can have a ratio of gullet radius to pitch of between substantially 30% to substantially 40% and more preferably substantially 34.2%. Further, the fifth gullet 130 can have a ratio of gullet radius to gullet depth of between substantially 90% to substantially 80% and more preferably substantially 85.6%. In addition, the fifth tooth 110 can have a ratio of gullet depth D5 to tooth pitch P4 in the range of substantially 35% to substantially 45% and more preferably substantially 40%.

In one example embodiment, a sixth gullet 134 can be disposed between the rake face 152 of the sixth tooth 112 and the one or more relief surfaces 162 of the fifth tooth 110. The sixth gullet 134 can have an effective radius of 0.082 inches. A sixth gullet depth D6 can be the vertical difference or distance between the tip 136 of the sixth tooth 112 and the lowest point of the sixth gullet 134. In certain example embodiments, the gullet depth D6 is less than the gullet depth of D3 and great than the gullet depth of D1, D2, D4, and D5. In one example embodiment, the gullet depth D6 can be anywhere between substantially 0.0850 inches to substantially 0.1250 inches and more preferably anywhere between substantially 0.0950 inches to substantially 0.1150 inches, and even more preferably anywhere between substantially 0.1000 inches to substantially 0.1100 inches and more preferably 0.1032 inches. Accordingly, the sixth gullet 134 can have a ratio of gullet radius to pitch of between substantially 30% to substantially 40% and more preferably substantially 34.2%. Further, the sixth gullet 134 can have a ratio of gullet radius to gullet depth of between substantially 85% to substantially 75% and more preferably substantially 79.5%. In addition, the sixth tooth 112 can have a ratio of gullet depth D6 to tooth pitch P5 in the range of substantially 35% to substantially 45% and more preferably substantially 43%.

Figure 2:
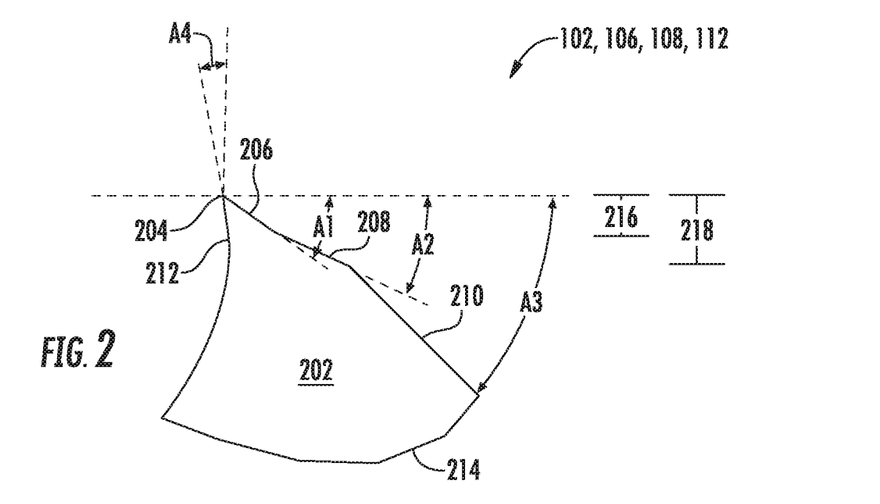
FIG. 2 is a partial side elevation view of a saw blade tooth used in conjunction with the saw blade of FIG. 1 according to one example embodiment of the disclosure.

In certain example embodiments, two different tooth geometries can be used for the teeth of the saw blade. For example, with the six tooth 102-112 repeating pattern, the first tooth 102, third tooth 106, fourth tooth 108, and sixth tooth 112 can have one tooth geometry, as shown and described with reference to FIG. 2 and the second tooth 104 and the fifth tooth 110 can have a second tooth geometry as shown and described with reference to FIG. 3. In one example embodiment, the decision on which tooth geometry to use for each tooth of the saw blade 100 may be based on if the tooth is a raker or straight set tooth, if the tooth is a light set tooth (either to the right or the left of centerline (410 of FIG. 4) of the saw blade 100), or if the tooth is a heavy set tooth (either to the right or the left of centerline (410 of FIG. 4) of the saw blade 100). In one example, the straight set and light set teeth have one tooth geometry, as shown and described with reference to FIG. 2, and the heavy set teeth have the second tooth geometry, as shown and described with reference to FIG. 3. The tooth geometry described in FIG. 2 provides a sharper tooth tip allowing for increased wear to occur without inhibiting the cutting performance of the blade. In this example, the second tooth geometry has a wider base size. This wider base size can provide increased strength for the heavy set teeth that are extending further out from the centerline (410 of FIG. 4) of the saw blade and thereby reduce the likelihood of the heavy set teeth breaking off. However, in other example embodiments, the teeth of the saw blade may only have one tooth geometry or may have more than two types of tooth geometries. Further, in other example embodiments, the teeth of the saw blade 100 may have 2 tooth geometries but the determination of which of the six teeth in the six tooth repeating set get which geometry may be different.

FIG. 2 is a partial side elevation view of a saw blade tooth having a first tooth geometry and used in conjunction with saw blade 100 of FIG. 1. In one example, the saw blade tooth geometry of FIG. 2 may be used for the first tooth 102, third tooth 106, fourth tooth 108, and sixth tooth 112 of the six tooth repeating set pattern of the saw blade 100. Referring now to FIGS. 1 and 2, the example saw blade tooth 102, 106, 108, 112, includes a tooth body 202, a tooth tip 204, a bottom end 214 coupled to or integrally formed with the blade body 114, and a rake face 212 extending generally downward from the tooth tip 204 generally along the front face of the tooth. In one example embodiment, the length of the rake face 212 (e.g., 142, 146, 148, and/or 152 of FIG. 1) between the tooth tip 204 (e.g., 116, 124, 128, and/or 136 of FIG. 1) and the point where the rake face 212 is tangent to a radius defined by the curvilinear base surface, can be substantially 0.010 inches. This relatively short rake face length allows the radius to be maximized thereby minimizing stress at the base of the tooth 102, 106, 108, 112. In one example embodiment, the first tooth 102 can have a ratio of rake face 142 length to gullet depth D1 of substantially 10.6%. The third tooth 106 can have a ratio of rake face 146 length to gullet depth D3 of substantially 9.5% in certain example embodiments. The fourth tooth 108 can have a ratio of rake face 148 length to gullet depth D4 of substantially 10.2% in certain example embodiments. The sixth tooth 112 can have a ratio of rake face 152 length to gullet depth D6 of substantially 9.7% in certain example embodiments. In one example embodiment, the rake face 212 defines a rake angle A4 measured from a plane extending perpendicular to the cutting direction X of the saw blade 100 (or between the tips of consecutively disposed teeth). In one example embodiment, the rake angle A4 is a positive rake angle, for example between substantially 0 degrees and substantially 20 degrees and preferably between substantially 5 degrees and substantially 15 degrees, and more preferably substantially 10 degrees. While the rake angle A4 is shown as a positive rake angle in FIG. 2, this is for example purposes only, as the rake angle A4 can be positive, neutral (0 degrees) or negative and can be anywhere between 30 degrees positive and 30 degrees negative, for example.

In addition, the saw blade tooth 102, 106, 108, 112 can also include multiple relief surfaces disposed generally along the rear face of the tooth. For example, the saw blade tooth 102, 106, 108, 112 can include a primary relief surface 206 having a first end and a distal second end, the first end extending from the tooth tip 204 towards the distal second end. In one example, the primary relief surface 206 can extend downward from the tooth tip 204 a primary vertical distance 216. In one example, the primary vertical distance 216 for the first tooth 102 is substantially 0.0095 inches, for the third tooth 106 is substantially 0.0114 inches, for the fourth tooth 108 is substantially 0.0094 inches, and for the sixth tooth 112 is substantially 0.0110 inches. The saw blade tooth 102, 106, 108, 112 can also include a secondary relief surface 208 having a third end and a distal fourth end, the third end extending from the second end of the primary relief surface 206 towards the distal fourth end. In one example, the secondary relief surface 208 can extend downward from the second end of the primary relief surface to a secondary vertical distance 218 from the tooth tip 204. In one example, the secondary vertical distance 218 for the first tooth 102 is substantially 0.0190 inches, for the third tooth 106 is substantially 0.0227 inches, for the fourth tooth 108 is substantially 0.0187 inches, and for the sixth tooth 112 is substantially 0.0219 inches. The saw blade tooth can further include a tertiary relief surface 210 having a fifth end and a distal sixth end, the fifth end extending form the fourth end of the secondary relief surface 208 towards the distal sixth end.

The primary relief surface 206 can have a primary relief angle A1 measured from a plane extending parallel to the cutting direction X of the saw blade 100. In one example embodiment, the primary relief angle A1 can be anywhere between substantially 30 degrees to substantially 40 degrees and preferably substantially 32.5 degrees to substantially 37.5 degrees, and more preferably substantially 35 degrees.

The secondary relief surface 208 can have a secondary relief angle A2 measured from a plane extending parallel to the cutting direction X of the saw blade 100. The secondary relief angle A2 can be less than the primary relief angle A1. In one example embodiment, the secondary relief angle A2 can be anywhere between substantially 20 degrees to substantially 30 degrees and preferably substantially 22.5 degrees to substantially 27.5 degrees, and more preferably substantially 25 degrees.

The tertiary relief surface 210 can have a tertiary relief angle A3 measured from a plane extending parallel to the cutting direction X of the saw blade 100. The tertiary relief angle A3 can be greater than the primary relief angle A1 and the secondary relief angle in certain example embodiments. In one example embodiment, the tertiary relief angle A3 can be anywhere between substantially 35 degrees to substantially 45 degrees and preferably substantially 40 degrees to substantially 45 degrees, and more preferably substantially 45 degrees.

Figure 3:
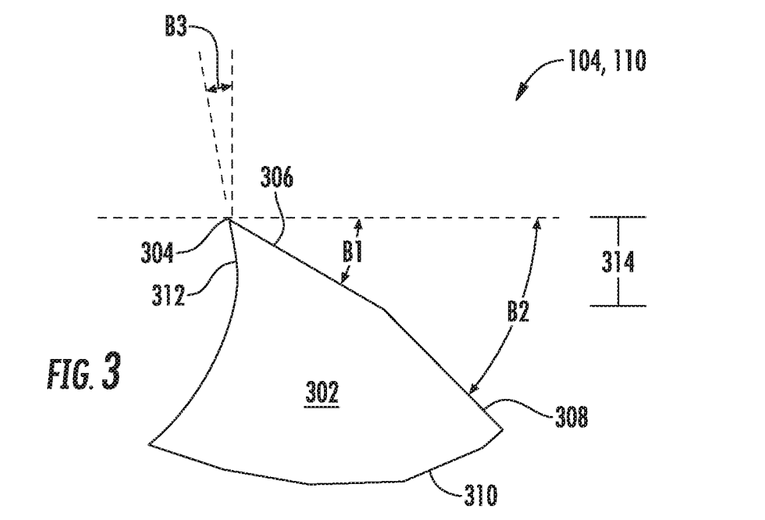
FIG. 3 is a partial side elevation view of another saw blade tooth used in conjunction with the saw blade of FIG. 1 according to one example embodiment of the disclosure.

FIG. 3 is a partial side elevation view of a saw blade tooth having a second tooth geometry different from the saw blade tooth of FIG. 2 and used in conjunction with saw blade 100 of FIG. 1. In one example, the saw blade tooth geometry of FIG. 3 may be used for the second tooth 104 and the fifth tooth 110 of the six tooth repeating set pattern of the saw blade 100. Referring now to FIGS. 1 and 3, the example saw blade tooth 104, 110, includes a tooth body 302, a tooth tip 304, a bottom end 310 coupled to or integrally formed with the blade body 114, and a rake face 312 extending generally downward from the tooth tip 304 generally along the front face of the tooth 104, 110. In one example embodiment, the length of the rake face 312 (e.g., 144 and/or 150 of FIG. 1) between the tooth tip 304 (e.g., 120 and/or 132 of FIG. 1) and the point where the rake face 312 is tangent to a radius defined by the curvilinear base surface, can be substantially 0.010 inches. This relatively short rake face length allows the radius to be maximized thereby minimizing stress at the base of the tooth 104, 110. In one example embodiment, the second tooth 104 can have a ratio of rake face 144 length to gullet depth D2 of substantially 13.2%. The fifth tooth 110 can have a ratio of rake face 150 length to gullet depth D5 of substantially 13.4% in certain example embodiments. In one example embodiment, the rake face 312 defines a rake angle B3 measured from a plane extending perpendicular to the cutting direction X of the saw blade 100 (or between the tips of consecutively disposed teeth). In one example embodiment, the rake angle B3 is a positive rake angle, for example between substantially 0 degrees and substantially 20 degrees and preferably between substantially 5 degrees and substantially 15 degrees, and more preferably substantially 10 degrees. While the rake angle B3 is shown as a positive rake angle in FIG. 3, this is for example purposes only, as the rake angle B3 can be positive, neutral (0 degrees), or negative and can be anywhere between 30 degrees positive and 30 degrees negative, for example.

In addition, the saw blade tooth 104, 110 can also include multiple relief surfaces disposed generally along the rear face of the blade body 302. For example, the saw blade tooth 104, 110 can include a primary relief surface 306 having a first end and a distal second end, the first end extending from the tooth tip 304 towards the distal second end. In one example, the primary relief surface 306 can extend downward from the tooth tip 304 a primary vertical distance 314. In one example, the primary vertical distance 314 for the second tooth 104 is substantially 0.0245 inches and for the fifth tooth 110 is substantially 0.0240 inches. The saw blade tooth 104, 110 can also include a secondary relief surface 308 having a third end and a distal fourth end, the third end extending from the second end of the primary relief surface 306 towards the distal fourth end.

The primary relief surface 306 can have a primary relief angle B1 measured from a plane extending parallel to the cutting direction X of the saw blade 100. In one example embodiment, the primary relief angle B1 can be anywhere between substantially 25 degrees to substantially 35 degrees and preferably substantially 27.5 degrees to substantially 32.5 degrees, and more preferably substantially 30 degrees. In one example embodiment, the primary relief angle B1 is less than the primary relief angle A1 of the saw blade tooth 102, 106, 108, 112. This results in the saw blade tooth of FIG. 2 having the appearance of a sharper, more angled tooth than the saw blade tooth 104, 110 of FIG. 3. The smaller primary relief angle B1 is configured to provide the tooth 104, 110 with a broader base area. As the teeth 104, 110 are more heavy set than the other teeth in the six tooth set, the broader base is configured to provide increase strength to the teeth 104, 110 that will receive a greater amount of force at the tip 204 due to the heavier set of those teeth 104, 110.

The secondary relief surface 308 can have a secondary relief angle B2 measured from a plane extending parallel to the cutting direction X of the saw blade 100. The secondary relief angle B2 can be greater than the primary relief angle B1. In one example embodiment, the secondary relief angle B2 can be anywhere between substantially 40 degrees to substantially 50 degrees and preferably substantially 42.5 degrees to substantially 47.5 degrees, and more preferably substantially 45 degrees.

Still referring to FIGS. 1-3, during a cutting operation, chips generated by the saw blade 100 flow into the gullet areas 118, 122, 126, 130, 134, 138 between consecutively disposed teeth 102-112. As the cutting operation continues, the chips must be discharged from the gullet areas 118, 122, 126, 130, 134, 138 so that newly generated chips can be accommodated. The large effective gullet radius Reff, the relatively short rake face 142-152, the relief surfaces, and the curvilinear base surfaces all cooperate to define a gullet area 118, 122, 126, 130, 134, 138 that provides for the smooth ingress and egress of chips to and from the gullet area 118, 122, 126, 130, 134, 138.

Figure 4:
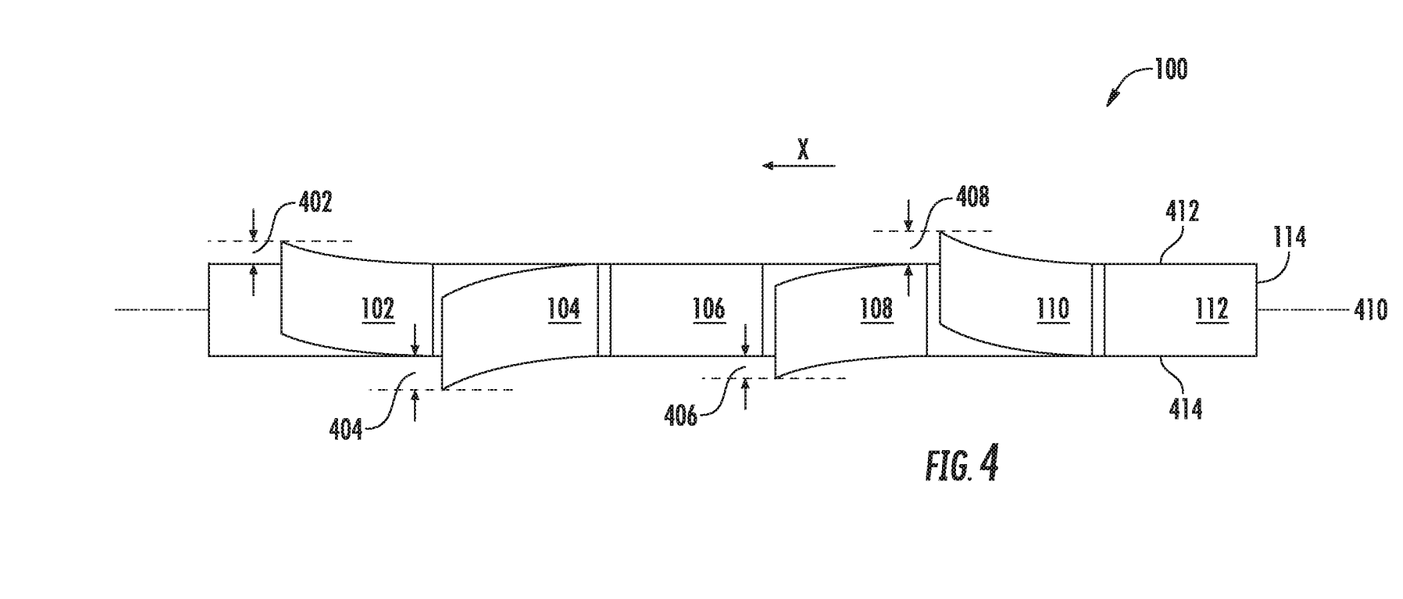
FIG. 4 is a partial top view of the saw blade of FIG. 1 according to one example embodiment of the disclosure.
Figure 5A:
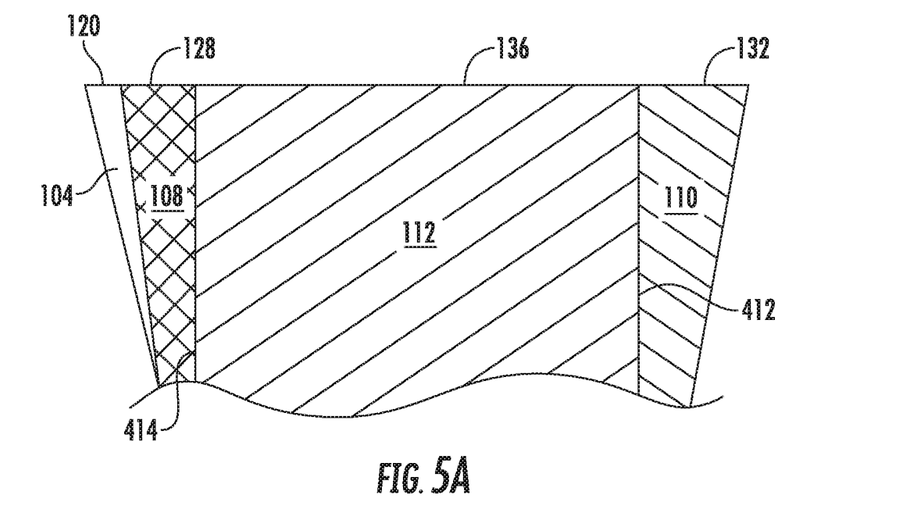
FIGS. 5A-B are partial front and rear elevation views of the saw blade of FIG. 1 according to one example embodiment of the disclosure.
Figure 5B:
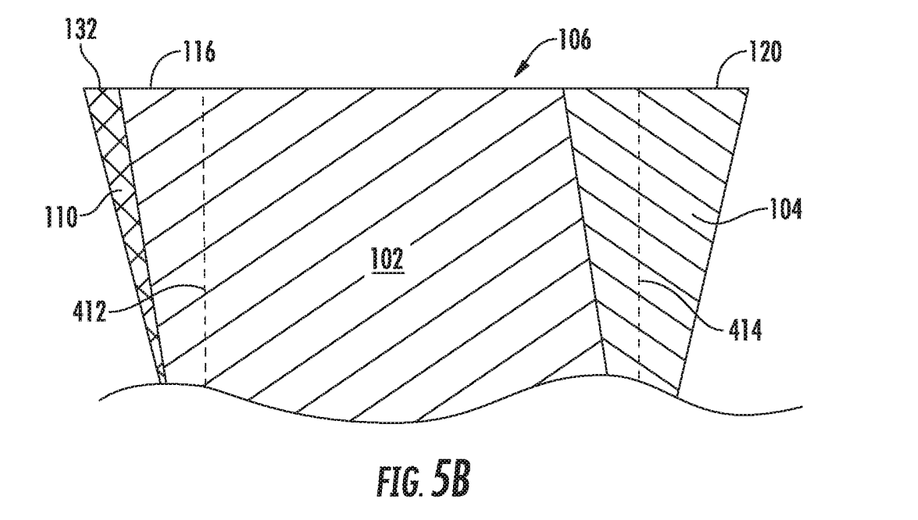

FIG. 4 is a partial top view of the saw blade 100 of FIG. 1 according to one example embodiment of the disclosure. FIGS. 5A-B are partial front and rear elevation views of the saw blade of FIG. 1 according to one example embodiment of the disclosure. Now referring to FIGS. 1-5B, the example saw blade 100 includes a repeating six-tooth pattern. In the tooth pattern, the first tooth pattern 102 is followed by the second tooth 104 which is followed by the third tooth 106, which is followed by the fourth tooth 108, which is followed by the fifth tooth 110, which is followed by the sixth tooth 112, which is followed by the pattern repeating again starting with the first tooth 102 in the cutting direction X of the saw blade 100. The blade body 114 of the saw blade 100 has a width defined by the right side edge 412 and the left side edge 414 of the blade body 114. In one example embodiment, the width of the blade body 114 can be between substantially 0.040 inches and substantially 0.052 inches and more preferably substantially 0.046 inches. This blade body width can be greater than some conventional saw blades, however, the increased width can provide increased strength (due to a larger base) for each of the teeth in the set pattern. Further, in the example embodiment shown and described with reference to FIGS. 4-5B, maximum set amounts can be less than conventional saw blades. As such, the combination of blade body width and maximum set in each direction, (e.g., the kerf width is substantially the same as conventional saw blades. Maintaining the overall kerf width of the saw blade results in a comparable or even increased cutting speed (due to the reduced maximum set amounts) as compared to conventional saw blades and can also increase the wear life of the blade.

In the six-tooth pattern, the first tooth 102 is a set tooth that is offset to a first side of the centerline 410 of the blade body 114. In one example, the first side is the right of the centerline 410 and the first tooth 102 extends out from the right side edge 412 of the blade body 114 by a first offset distance 402. In one example, the first tooth 102 is considered to be a "light set" tooth because the first tooth 102 is offset from the centerline 410 of the blade body 114 by a distance that is less than or equal to 0.010 inches. In one example, the first tooth 102 is offset the first offset distance 402 of between substantially 0.001 inches and substantially 0.010 inches and more preferably substantially 0.007 inches.

The second tooth 104 is a set tooth that is offset to an opposite, second side of the centerline 410 of the blade body 114 of the set for the first tooth 102. In one example, the second side is the left of the centerline 410 and the second tooth 104 extends out from the left side edge 414 of the blade body 114 by a second offset distance 404. In one example, the second tooth 102 is considered to be a "heavy set" tooth because the second tooth 102 is offset from the centerline 410 of the blade body 114 by a distance that is greater than 0.010 inches. In one example, the second tooth 104 is offset the second offset distance 404 of between substantially 0.011 inches and substantially 0.020 inches and more preferably substantially 0.017 inches.

The third tooth 106 is a raker or unset tooth and is aligned with the centerline 410 of the blade body and its outer edges do not extend outside of the right 412 and left 414 sides of the blade body 114.

The fourth tooth 108 is a set tooth that is offset to the same side of the centerline 410 of the blade body 114 as the set for the second tooth 104. In one example, the fourth tooth 108 is set to the left of the centerline 410 and extends out from the left side edge 414 of the blade body 114 a third offset distance 406. In one example, the fourth tooth 108 is a light set tooth and the fourth tooth 108 is offset from the centerline 410 of the blade body 114 by the third offset distance 406 of between substantially 0.001 inches and substantially 0.010 inches and more preferably substantially 0.010 inches.

The fifth tooth 110 is a set tooth that is offset to the same side of the centerline 410 of the blade body 114 as the set for the first tooth 102. In one example, the fifth tooth 110 is set to the right of the centerline 410 and extends out from the right side edge 412 of the blade body 114 a fourth offset distance 408. In one example, the fifth tooth 110 is a heavy set tooth and the fifth tooth 110 is offset from the centerline 410 of the blade body 114 by the fourth offset distance 408 of between substantially 0.011 inches and substantially 0.020 inches and more preferably substantially 0.013 inches.

The sixth tooth 112 is a raker or unset tooth and is aligned with the centerline 410 of the blade body and its outer edges do not extend outside of the right 412 and left 414 sides of the blade body 114.

As described above, the offset of the heavy set tooth 104 to the second side 414 of the blade body 114 can be greater than the offset of the heavy set tooth 110 to the first side 412 of the blade body 114 and the offset of the light set tooth 108 to the second side 414 of the blade body 114 can be greater than the offset of the light set tooth 102 to the first side 412 of the blade body 114. In one example, the saw blade is for a hole or cup saw and the saw blade 100 during manufacture is made into a circular shape such that the second side 414 of the blade body 114 defines an inner surface of the hole saw and the first side 412 of the blade body defines an outer surface of the hole saw. Having a greater offset along the inner surface of the hole saw can help to reduce the outer diameter of the material being cut by the hole saw such that the material getting cut has an outer diameter that is sufficiently less than the inner diameter of the hole saw (defined by the inner surface, or second side 414, of the hole saw) that the material getting cut will not bind within the cavity of the hole saw defined by the inner surface, or second side 414 of the hole saw and blade body 114.

As described above, each unset tooth is followed by a light set tooth and then a heavy set tooth. Providing a light set tooth after the raker tooth and before the heavy set tooth can reduce the amount of material that the heavy set tooth will need to cut and thus, reduce the amount of load on the heavy set tooth. Reducing the amount of load on the heavy set tooth can reduce the likelihood that the heavy set tooth will bind during the cutting process and/or bread off from the blade body 114.

Further, as shown in FIGS. 1-4, the gullet depths D2 and D5, which are positioned immediately before each of the heavy set teeth 104, 110 are less than the remaining gullet depths D3, D4, D6, D1 for the saw blade 100. The reduced gullet depth D2, D5 results in more blade material immediately before the heavy set teeth 104, 110, which provides an increased base for the heavy set teeth 104, 110 and increases the strength of the heavy set teeth. The reduced gullet depth D2, D5 also results in an effectively shorter tooth 104, 110 from the base of the blade material to the respective tip even though all of the teeth 102-112 have the same height when measured from the back side 140 of the blade body 114. The increased base size and shorter effective tooth height reduces the likelihood that the heavy set teeth 104, 110 will bind and/or break off from the blade body 114 during a cutting operation.

Further, as shown in FIGS. 1-4, the pitch distances P1, P4 between the tips 120, 132 of the heavy set teeth 104, 110 and the tips 116, 128 of the immediately preceding light set teeth 102, 108 respectively is less than the remaining pitch distances P2, P3, P5, P6 of the saw blade 100. The smaller pitch distances P1, P4 results in more blade material immediately before the heavy set teeth 104, 110, which provides an increased base for the heavy set teeth 104, 110 and increases the strength of the heavy set teeth 104, 110. The increased based size caused by the smaller pitch distances P1, P4 reduces the likelihood that the heavy set teeth 104, 110 will bind and/or break off from the blade body 114 during a cutting operation. Further, the reduced pitch distance P1, P4, reduced gullet depth D2, D5 and the larger base for the heavy set teeth as a result of the smaller primary clearance angle 306, as compared to the primary clearance angle 206 of the remaining teeth in the repeating set, can collectively result in a larger base and stronger heavy set tooth 104, 110 to reduce the likelihood that the heavy set tooth 104, 110 may bind and/or break off during a cutting operation. Further, the reduced pitch distances P1, P4 reduces the size of chip that can be cut by the heavy set tooth 104, 110 from the material being cut. This can further limit the amount of stress that is induced or applied to the heavy set tooth 104, 110 during a cutting process.

Further, the pitch distances P2, P5 preceding the raker or straight set teeth 106, 112 in the cutting direction X can be larger than the remaining pitch distances P1, P3, P4, P6. The larger pitch distances P2, P5 preceding each raker tooth 106, 112 can allow for differences in the tooth geometry of the raker 106, 112 and light set 102, 108 teeth as compared to the heavy set teeth 104, 110. The raker 106, 112 and light set 102, 108 teeth can have a more aggressive (sharper) tooth tip (as shown and described in FIG. 2) that can generate a larger chip size that is cut from the material being cut by the raker 106, 112 and light set 102, 108 teeth.

Thus, in certain example embodiments, the saw blade 100 can have a repeating set tooth pattern that includes a variable pitch distance, a variable gullet depth, variable offset, and variable offset difference. While the example embodiment is shown and described as a six-tooth repeating pattern, the repeating pattern can include fewer or greater than six teeth. Further, in other example embodiments, one or more of the gullet depth and variable offset difference may be constant rather than variable. Accordingly, the features described herein alone or in any combination reduce the likelihood of the teeth of the saw blade shearing or tearing from the blade body, thereby enabling saw blade to cut materials at higher speeds which would normally impose large amounts of stress on the teeth.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments.

What is claimed is:

1. A saw blade comprising:
   a blade body;
   a cutting edge extending along the blade body, wherein the cutting edge comprises a plurality of teeth in a repeating pattern, each tooth having a corresponding gullet adjacent the tooth in a cutting direction and each tooth including a tip, a rake face located on a first side of the tip facing toward the cutting direction, and a clearance surface located on a second side of the tip facing away from the cutting direction, wherein each tooth defines a pitch distance from the tip to an adjacent tip of an adjacent tooth in the cutting direction and each gullet defines a gullet depth from the tip of the tooth to a lowest point of the gullet in a vertical direction substantially perpendicular to the cutting direction,
   wherein the repeating pattern of teeth includes
      a first light set tooth set in a first direction by a first set distance and defining a first pitch distance and a corresponding first gullet defining a first gullet depth,
      a second heavy set tooth set in a second direction opposite the first direction by a second set distance and defining a second pitch distance and a corresponding second gullet defining a second gullet depth,
      a third unset tooth defining a third pitch distance and a corresponding third gullet defining a third gullet depth,
      a fourth light set tooth set in the second direction by a fourth set distance and defining a fourth pitch distance and a corresponding fourth gullet defining a fourth gullet depth,
      a fifth heavy set tooth set in the first direction by a fifth set distance and defining a fifth pitch distance and a corresponding fifth gullet defining a fifth gullet depth,
   wherein each of the first set distance and the fourth set distance is less than each of the second set distance and the fifth set distance,
   wherein each of the second pitch distance and the fifth pitch distance is less than each of the first pitch distance and the fourth pitch distance, and each of the first pitch distance and the fourth pitch distance is less than the third pitch distance, and
   wherein each of the second gullet depth and the fifth gullet depth is less than each of the first gullet depth and the fourth gullet depth, and each of the first gullet depth and the fourth gullet depth is less than the third gullet depth.

2. The saw blade of claim 1, wherein the blade body is cylindrical to form a holesaw, the first direction is toward an outside of the blade body and the second direction is toward an inside of the blade body.

3. The saw blade of claim 1, wherein a ratio of the gullet depth to the pitch distance for each tooth is substantially 35% to substantially 45%.

4. The saw blade of claim 1, wherein the clearance surface of each of the light set teeth has a primary clearance portion adjacent the tip with a primary clearance angle, a secondary clearance portion adjacent the primary clearance surface with a secondary clearance angle that is less than the primary clearance angle, and a tertiary clearance portion adjacent the secondary clearance surface with a tertiary clearance angle that is greater than the secondary clearance angle.

5. The saw blade of claim 4, wherein the clearance surface of each of heavy set teeth has a primary clearance portion adjacent the tip with a primary clearance angle and a secondary clearance portion adjacent the primary clearance surface with a secondary clearance angle that is greater than the primary clearance angle.

6. The saw blade of claim 5, wherein the primary clearance angle of the unset and light set teeth is greater than the primary clearance angle of the heavy set teeth.

7. The saw blade of claim 6, wherein the primary clearance angle of the unset and light set teeth is substantially 30° to substantially 40° and the primary clearance angle of the heavy set teeth is substantially 25° to substantially 35°.

8. The saw blade of claim 1, wherein the first set distance and the fourth set distance are less than or equal to substantially 0.010" and the second set distance and the fifth set distance is greater than or equal to substantially 0.011".

9. The saw blade of claim 1, wherein the first pitch distance is substantially 0.18" to substantially 0.25", the second pitch distance is substantially 0.15" to substantially 0.24", the third pitch distance is substantially 0.22" to substantially 0.27", the fourth pitch distance is substantially 0.195" to substantially 0.255", and the fifth pitch distance is substantially 0.155" to substantially 0.215".

10. The saw blade of claim 1, wherein, for each light set tooth, the set distance is substantially 2% to substantially 5% of the pitch distance and, for each heavy set tooth, the set distance is substantially 5% to substantially 13% of the pitch distance.

11. The saw blade of claim 1, wherein the repeating pattern of teeth further comprises a sixth unset tooth defining a sixth pitch distance and a corresponding sixth gullet defining a sixth gullet depth, wherein each of the first pitch distance and the fourth pitch distance is less than the sixth pitch distance, and each of the first gullet depth and the fourth gullet depth is less than the sixth gullet depth.

12. The saw blade of claim 1, wherein the second heavy set tooth immediately follows the first light set tooth, the third unset tooth immediately follows the second heavy set tooth, the fourth light set tooth immediately follows the third unset tooth, and the fifth heavy set tooth immediately follows the fourth light set tooth in a direction opposite the cutting direction.

13. A saw blade comprising:
a blade body;
a cutting edge extending along the blade body, wherein the cutting edge comprises a plurality of teeth, each tooth having a corresponding gullet adjacent the tooth in a cutting direction and each tooth including a tip, a rake face located on a first side of the tip facing toward the cutting direction, and a clearance surface located on a second side of the tip facing away from the cutting direction, the plurality of teeth including at least one unset tooth and a plurality of set teeth each set by a set distance,
wherein each tooth defines a pitch distance from the tip of the tooth to an adjacent tip of an adjacent tooth in the cutting direction and each gullet defines a gullet depth from the tip of the tooth to a lowest point of the gullet in a vertical direction substantially perpendicular to the cutting direction,
wherein the plurality of set teeth includes first set teeth and second set teeth, the first set teeth having a larger set distance than the set distance of the second set teeth and the first set teeth having a smaller pitch distance and a smaller gullet depth than the pitch distance and the gullet depth of the second set teeth, and the pitch distance of the at least one unset tooth is greater than the pitch distances of the each of the set teeth and the gullet depth of the at least one unset tooth is greater than the gullet depths of the each of the set teeth.

14. The saw blade of claim 13, wherein the blade body is cylindrical to form a holesaw.

15. The saw blade of claim 13, wherein a ratio of the gullet depth to the pitch distance for each tooth is substantially 35% to substantially 45%.

16. The saw blade of claim 13, wherein each clearance surface is at a clearance angle relative to a line extending in the cutting direction, the clearance angles of the set teeth decreasing as the set distance increases.

17. The saw blade of claim 13, wherein the plurality of set teeth include a plurality of light set teeth set at a light set distance and a plurality of heavy set teeth set a heavy set distance that is greater than the light set distance.

18. The saw blade of claim 17, wherein, for each light set tooth, the set distance is substantially 2% to substantially 5% of the pitch distance and, for each heavy set tooth, the set distance is substantially 5% to substantially 13% of the pitch distance.

19. The saw blade of claim 18, wherein the plurality of teeth are arranged in a repeating pattern that includes a first light set tooth set in a first direction, a second heavy set tooth set in an opposite second direction, a third unset tooth, a fourth light set tooth set in the second direction, and a fifth heavy set tooth set in the first direction.

20. The saw blade of claim 19, wherein the second heavy set tooth immediately follows the first light set tooth, the third unset tooth immediately follows the second heavy set tooth, the fourth light set tooth immediately follows the third unset tooth, and the fifth heavy set tooth immediately follows the fourth light set tooth in a direction opposite the cutting direction.

* * * * *